United States Patent
Aboczky

(10) Patent No.: US 6,438,891 B1
(45) Date of Patent: Aug. 27, 2002

(54) CATCH-AND-RELEASE DEVICE

(75) Inventor: Robert Aboczky, Upper Saddle River, NJ (US)

(73) Assignee: Abori, Inc., Garfield, NJ (US)

( * ) Notice: Subject to any disclaimer, the term of this patent is extended or adjusted under 35 U.S.C. 154(b) by 0 days.

(21) Appl. No.: 09/546,123

(22) Filed: Apr. 10, 2000

(51) Int. Cl.$^7$ ............................................. A01K 97/00
(52) U.S. Cl. ....................................... 43/53.5; 294/19.1
(58) Field of Search .......................... 43/53.5; 294/19.1, 294/19.3, 22, 23

(56) References Cited

U.S. PATENT DOCUMENTS

| | | | | |
|---|---|---|---|---|
| 268,950 A | * | 12/1882 | Simkins ........................ | 294/22 |
| 465,222 A | * | 12/1891 | Ulbricht ....................... | 294/22 |
| 704,692 A | * | 7/1902 | Beider ......................... | 294/22 |
| 747,376 A | * | 12/1903 | Christsman .................. | 294/22 |
| 960,070 A | * | 5/1910 | Brown ......................... | 294/22 |
| 1,087,649 A | * | 2/1914 | Fournet ....................... | 294/22 |
| 1,120,735 A | * | 12/1914 | Moyer ......................... | 294/22 |
| 1,124,207 A | * | 1/1915 | Bujese ......................... | 294/22 |
| 1,180,764 A | * | 4/1916 | Derdits ........................ | 294/22 |
| 1,328,860 A | * | 1/1920 | Walsh .......................... | 294/22 |
| 1,337,398 A | * | 4/1920 | Fleckner ...................... | 294/22 |
| 1,453,301 A | * | 5/1923 | Winkler ....................... | 294/22 |
| 1,759,524 A | * | 5/1930 | Smith .......................... | 294/22 |
| 1,916,866 A | * | 7/1933 | Porter .......................... | 294/22 |
| 2,575,638 A | * | 11/1951 | Price ........................... | 294/22 |
| 2,836,004 A | * | 5/1958 | Stader ......................... | 43/53.5 |
| 3,514,892 A | * | 6/1970 | Wormsbecker .............. | 43/53.5 |
| 3,714,732 A | * | 2/1973 | Little .......................... | 43/53.5 |
| 4,682,716 A | * | 7/1987 | Morellini ..................... | 222/529 |
| 5,119,585 A | * | 6/1992 | Camp .......................... | 43/53.5 |

* cited by examiner

*Primary Examiner*—Kurt Rowan
(74) *Attorney, Agent, or Firm*—Siegmar Silber

(57) ABSTRACT

The invention disclosed herein is a catch-and-release device that has a unique mechanism with a self-locking function independent of external resistance. The catch-and-release device hereof has opposing C-shaped jaws that are reciprocally driven between an open position and a closed position by a crank and slider assembly. The crank of the crank and slider assembly rotates approximately 90° in one direction during closing and locking and rotates approximately 90° in the opposite direction during unlocking and opening. The crank arm of the crank and slider assembly is at one end eccentrically mounted to the crank and at the other end flexibly mounted to a reciprocating slider which, in turn, is attached at the other end thereof to the operating arms of the jaws. The crank arm during the rotation of the crank (in either direction) reaches a position or null point wherein the longitudinal axes of the crank arm and the reciprocating slider are aligned. A spring is secured to the crank and slider assembly that biases the crank arm toward the crank. The spring force with the crank rotating in the direction of closing and locking is initially exerted counter to the closing effort.

11 Claims, 2 Drawing Sheets

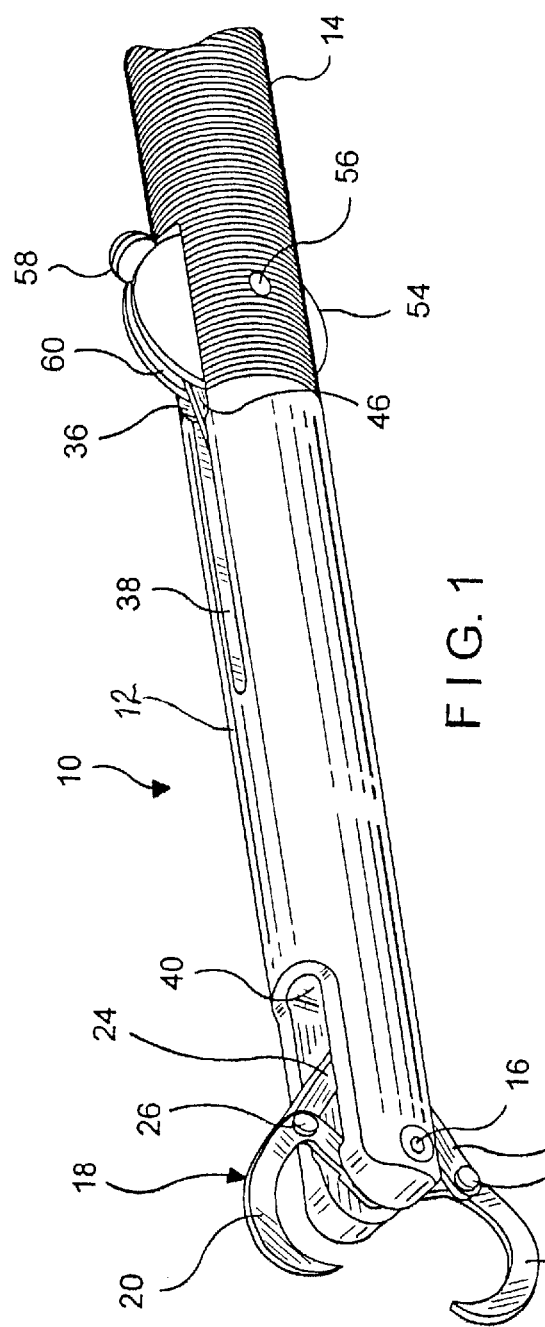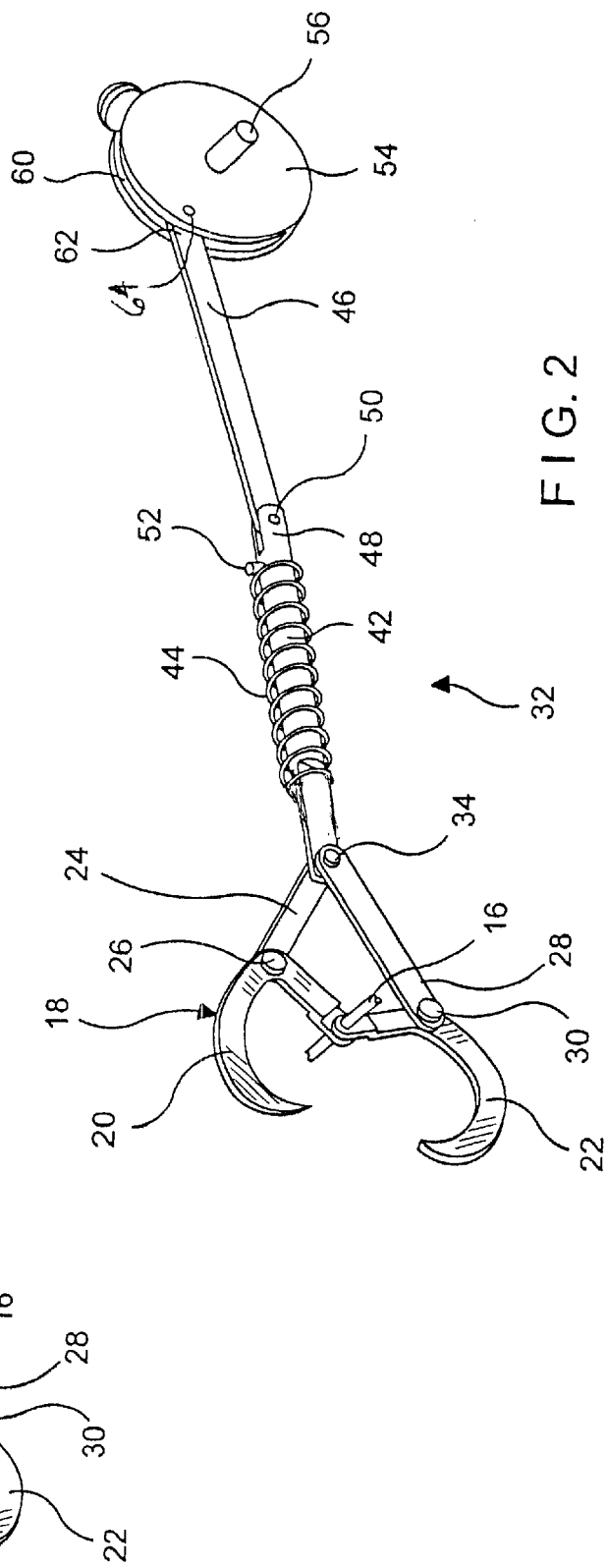

CATCH-AND-RELEASE DEVICE

BACKGROUND OF THE INVENTION

1. Field of the Invention

This invention relates to a catch-and-release device to enable a fisherman to securely grip a fish by the lower lip during the release procedure. The catch-and-release device minimizes both injury to the fish and the handling of the fish during release. In so doing, the natural protective coating of the fish is preserved and the survival rate upon release is optimized.

2. Description of the Prior Art

Today's sport fishing regulations have evolved so that more and more fisherman are required to catch and release a larger proportion of the fish caught. This is designed to maintain fish and stream environments and to provide, where a particular species needs protection, the necessary level of intervention.

While these regulations did not meet initially with universal acceptance, the catch-and-release mode is now sufficiently integrated into sport fishing that equipment facilitating the procedures is more widely available. For example, the fish handling tool of C. D. Camp, described in U.S. Pat. No. 5,119,585 has been introduced to the market. This prior art device provides a fish handling device in which the gripping pressure of the jaws is increased by the weight of the fish.

When operating in the catch-and-release mode, it is of key importance that the handling of fish caught on the line be in a manner that is least harmful to the fish. Minimally a gripping device is needed which is easy to handle with one hand so that the other hand is free to disengage the fishhook. Such gripping devices nip the lip of the fish between two jaws operating between an open and a closed position. With a resistance-dependent mechanism, there is a greater possibility of damage to an active fish than there is with a gripping mechanism that is independent of external resistance. With a relaxed fish, there is more likelihood with the prior art device that the resistance to the gripping mechanism is below the level required for self-locking operation which, in turn, leads to premature release of the fish.

The device of the present invention, as will be seen from the description which follows, overcomes the problems created by a resistance-dependent, self-locking mechanism and exhibits the advantageous provided hereinbelow.

SUMMARY OF THE INVENTION

The invention disclosed herein is a catch-and-release device that has a unique mechanism with a self-locking function independent of external resistance. The catch-and-release device hereof has opposing C-shaped jaws that are reciprocally driven between an open position and a closed position by a crank and slider assembly. The crank of the crank and slider assembly rotates approximately 90° in one direction during closing and locking and rotates approximately 90° in the opposite direction during unlocking and opening. The crank arm of the crank and slider assembly is at one end eccentrically mounted to the crank and at the other end flexibly mounted to a reciprocating slider which, in turn, is attached at the other end thereof to the operating arms of the jaws. The crank arm during the rotation of the crank (in either direction) reaches a position or null point wherein the longitudinal axes of the crank arm and the reciprocating slider are aligned. A spring is secured to the crank and slider assembly that biases the crank arm toward the crank. The spring force with the crank rotating in the direction of closing and locking is initially exerted counter to the closing effort. When this force is overcome and the null point is passed, the spring force is then exerted in the opposite direction and maintains the locking position. Conversely, the spring force with the crank rotating in the direction of opening and unlocking is initially exerted counter to the unlocking effort. When this force is overcome and the null point is passed, the spring force is exerted in the opposite direction to maintain the jaws in an open condition.

The crank and slider assembly is mounted in an elongated or tubular body having a handle portion at one end thereof. Adjacent the handle, a crank slot accommodates the crank on an axis transverse to that of the elongated body. The crank slot also provides limits restricting the rotatory motion of the crank to the approximately 90° of rotation described supra. Adjacent the crank slot, the tubular body has on one side thereof a crank arm relief slot which receives the misaligned crank arm when the eccentric mounting point is rotated beyond the null point to the same side of tubular body. As the wall of the tubular body opposite the relief slot is intact, upon the crank arm being misaligned in the opposite direction as just described, the wall acts as a stop or lock with the spring retaining the crank arm in the locked condition.

An object of the present invention is to provide a catch-and-release device which combines a unique self-locking mechanism with a pair of gripping jaws enabling the fisherman to nip the lower lip of a fish by a simple one-handed operation and upon detaching the fish hook from a fish releasing the fish to his environment.

Another object of the invention is to provide a fish gripping tool which is easy to manufacture and can be made in various lengths for differing applications, e.g. fishing from a riverbank and fishing from a boat.

A further object of the invention is to provide a catch-and-release device which is easy to lock onto the lower lip of the fish and is easy to release the locking mechanism thereof, which device ensures minimal handling by the fisherman of the fish and without interfering with the exterior coating of the fish.

This together with other objects and advantages will become apparent in the description which follows.

BRIEF DESCRIPTION OF THE DRAWINGS

Throughout the drawings which follow, the same reference designators are used for the same parts.

FIG. 1 is a perspective view of catch-and-release device of the present invention;

FIG. 2 is a perspective view of the crank and slider assembly of FIG. 1;

DESCRIPTION OF THE PREFERRED EMBODIMENT

Figure 3:
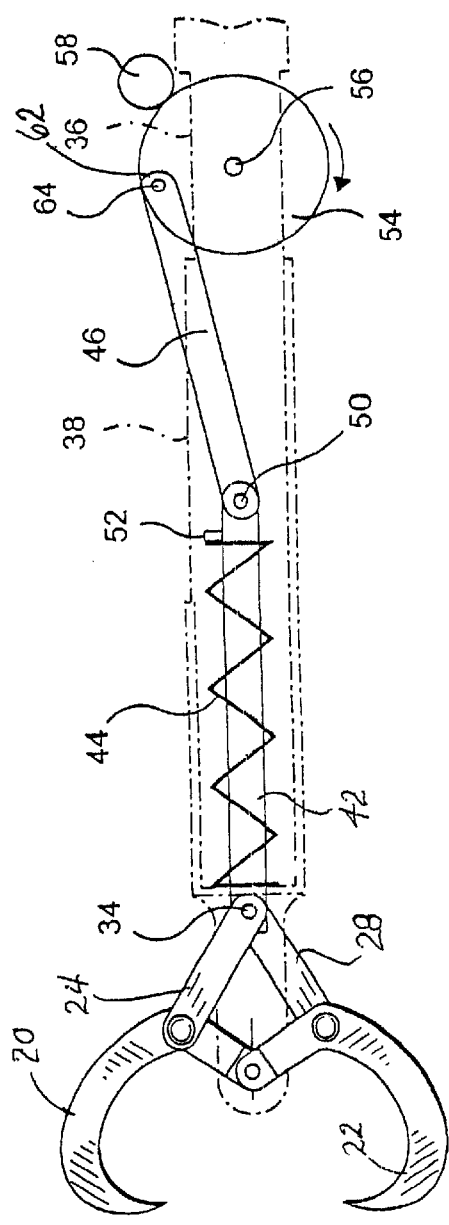
FIG. 3 is a schematic diagram showing the operation of the fish gripping device of FIG. 1 and illustrates the device in the open position.

A catch-and-release device of this invention is for holding the lip of a fish while removing the fishhook from the fish. The device has an elongated body with a longitudinal axis therethrough. The body has a handle portion at one end, a central bore open at one end and coaxial with the longitudinal axis, and a fixed pivot in the open end of the bore. The device includes a pair of C-shaped jaws, each of which is attached at one end thereof to the fixed pivot and rotatable thereabout. Upon rotation, the jaws operate between a closed position with the unattached end of the jaws meeting and an open position for accepting the lip of a fish. A pair of operating arms, for rotating the jaws about the fixed pivot, are each attached at one end thereof to a point medial the ends of a C-shaped jaw. A crank and slider assembly is mounted in the central bore and attached at one end by a movable pivot to the operating arms. The crank and slider assembly has a crank with a crank arm eccentrically mounted thereto. The crank arm translates a rotational crank movement to a linear forward movement and translates a counter rotational crank movement to a linear rearward movement. The crank arm opens the C-shaped jaws upon forward movement and locks the C-shaped jaws upon rearward movement. A spring is mounted between the slider and the interior wall of the elongated body, which spring is biased toward the handle portion. This provides a spring force against opening of the device and toward locking of the device.

Referring now to FIGS. 1 and 2, this disclosure is of a catch-and-release device, generally indicated by the reference numeral 10. The device is designed to securely hold the lip of a fish to aid the angler in landing the fish or in holding the fish while fishhooks are removed and the release of the fish is effectuated. The catch-and-release device 10 is constructed with an elongated, cylindrical body 12 with a handle portion 14 at one hand and a fixed, gripping jaw pivot 16 at the opposite end thereof. Mounted at the pivot end of the handle, an articulated gripping jaw assembly 18 is constructed with two C-shaped jaw portions 20 and 22. The jaws 20 and 22 are mounted coplanar to one another so that the open portions of the "C" shapes are facing each other. The two jaws 20 and 22 are attached at one end thereof to the fixed pivot 16 and are operable between an open end and a closed position. To the gripping jaw 20 and, medial the ends thereof, an operating arm 24 is attached at radial pivot 26. Similarly, gripping jaw 22 is attached to operating arm 28 at radial pivot 30. The crank and slider assembly 32, described in detail below, is attached to operating arms 24 and 28 by movable pivot 34. The mechanical arrangement is such that the reciprocation of the crank and slider assembly 32 is translated from a linear motion at the movable pivot 34 to an arcuate motion at radial pivots 26 and 30. The radius of the arcuate motion for gripping jaw 20 is from the center of fixed pivot 16 to the center of radial pivot 26; and, for gripping jaw 22, from the center of fixed pivot 16 to the center of the radial pivot 30.

The reciprocation drive and locking mechanism is next discussed. The elongated body 12 is configured to house the crank and slider assembly 32 by having a crank slot 36 therethrough, a crank arm relief slot 38 through one side of the body, and a central bore 40 extending from the fixed pivot end of the body to the crank slot 36. The crank and slider assembly 32 is constructed to extend from the movable pivot 34 by having a spring-loaded reciprocating slider 42 fitted in the central bore 40 and being substantially coaxial therewith. Spring 44 is mounted around the slider 42 and is structured to urge the assembly 32 rearward toward handle portion 14 and to provide locking as described below. At the end of the reciprocating slider 42 opposite the movable pivot 34, a crank arm 46 is joined thereto by a knuckle joint 48 and crank arm pin 50. A spring retaining fitting 52 is mounted on the slider 42 adjacent joint 48. A crank 54 is mounted to the elongated body 12 by a crank pin 56 at crank slot 36. A crank handle 58 is attached to the periphery of the disk for the purpose of operating the crank and slider assembly 32 in a reciprocating motion back and forth in central bore 40. The crank slot 36, in the embodiment shown, limits the crank action to an approximate 90 degrees of rotation. The crank 54 includes a centrally placed cavity 60 which is constructed to receive end 62 of the crank arm 46. This end 62 is the end opposite the knuckle joint 48 and end 62 is attached to the crank 54 by crank arm pin 64.

Figure 4:
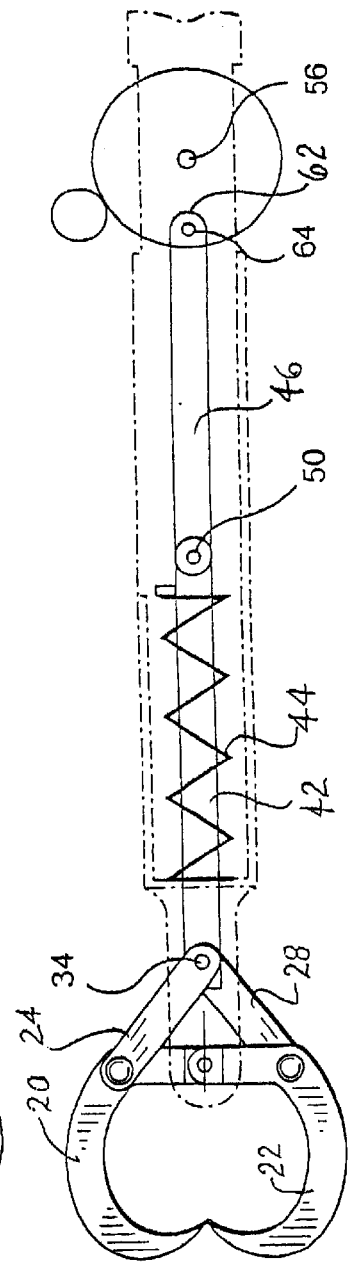
FIG. 4 is a schematic diagram, similar to FIG. 3, but illustrating the device in the null position; and, FIG. 5 is a schematic diagram similar to FIG. 3, but illustrating the device in the locked position.
Figure 5:
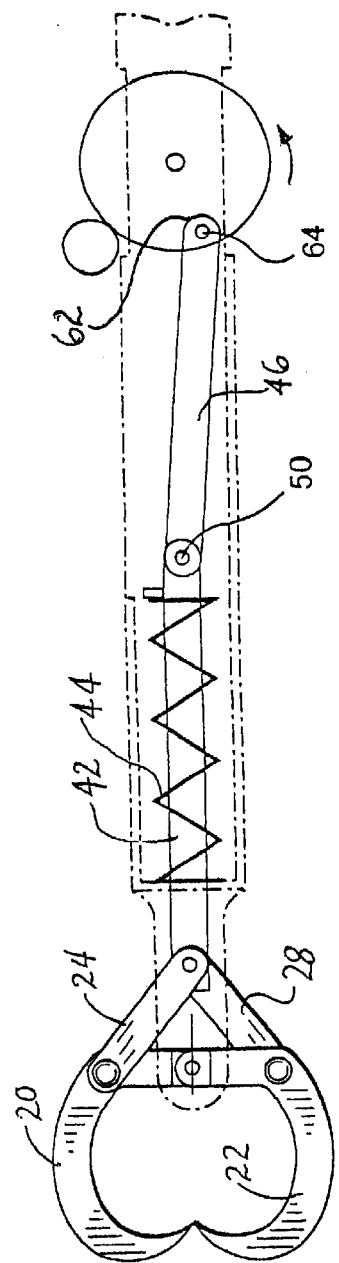

In operation, the catch-and-release device, shown in FIGS. 3 through 5 of this invention, is discussed in relation to the preferred embodiment described above. It is realized that slight changes such as moving the crank handle 58 to a position 180° about the periphery of the crank 54 would alter the operating description, but not the underlying mechanical working of the device. In the present device, with the crank handle 58 rotated rearwardly (that is away from the gripping jaws 20 and 22), the spring 44 extends moving the slider 42 rearward and causing operating arms 24 and 28 to move radial pivots 26 and 30 on an arcuate pathway opening the gripping jaw assembly 18 to the fully open position (limited by the structural stop described supra). Simultaneously the end 62 of crank arm 46 is at rest in crank arm relief slot 38 and cavity 60, FIG. 1, of crank 54, FIG. 3. As the crank handle 58 is rotated forwardly (that is toward the gripping jaws 20 and 22), the spring 44 compresses moving the slider 42 forward and causing operating arms 24 and 28 to move radial pivots 26 and 30 on an arcuate pathway closing the gripping jaw assembly 18. If the forward motion of the crank handle 58 is considered counterclockwise, initially the spring 44 provides an opposite clockwise force. As the crank arm 46 and slider 42 come into alignment a null point is reached, FIG. 4. Upon further forward motion of the crank handle 58 continuation beyond the null point, the spring 44 provides a counterclockwise force urging the end 62 of crank arm 46 into a locked position. The locked position of the crank arm 46 entraps the end 62 between the walls of central bore 40 and cavity 60 and holds the end 62 by the counterclockwise force from spring 44. Upon unlocking, the crank handle 58 is moved counterclockwise until the null point is reached. The spring 44 forces then change to clockwise and urges the gripping device to a fully open condition.

The invention disclosed hereby is presented as a unique crank mechanism wherein the self-locking crank arm at one end of its travel locks against the interior wall of the device and is held there released. Thus, the appended claims are to be interpreted broadly, as it is understood that slight variations can be made in the device without departing from the spirit of this invention.

What is claimed is:

1. A catch-and-release device for holding the lip of a fish while removing the fishhook from the fish, said device comprising, in combination:
   an elongated body having a longitudinal axis therethrough, said elongated body, in turn, comprising:
      a handle portion at one end thereof;
      a central bore coaxial with said longitudinal axis, said central bore being open at one end;
      a fixed pivot in said open end of said bore;
   a pair of C-shaped jaws, each attached at one end thereof to said fixed pivot and rotatable thereabout between a closed position with the unattached end of said jaws meeting and an open position for accepting the lip of a fish;
   a pair of operating arms, each attached at one end to a C-shaped jaw medial the attached end of said C-shaped jaw and the unattached end of said C-shaped jaw, for rotating the jaws about the fixed pivot;

a crank and slider assembly in said central bore and attached at one end thereby to said operating arms, said crank and slider assembly having a crank with a crank arm eccentrically mounted to the crank, said crank arm translating a rotational crank movement to a linear forward movement and translating a counter rotational crank movement to a linear rearward movement, said crank arm opening said C-shaped jaws upon forward movement and locking said C-shaped jaws upon rearward movement, said crank arm movable in a plane normal to the crank axis, and, when aligned with the longitudinal axis of said elongated body defining a null position;

said crank arm, when beyond the null position in one direction transmitting the spring force against opening of the device, and, when beyond the null position in the other direction, transmitting the spring force toward locking of the device; and, a spring on said crank and slider assembly biased toward the handle portion providing a spring force against opening of the device and toward locking of the device.

2. A catch-and-release device as described in claim 1, wherein said crank is mounted on an axis transverse to the longitudinal axis of said elongated body.

3. A catch-and-release device as described in claim 1 wherein said crank arm linear rearward movement is unrestricted by the inner wall of said central bore and said crank arm linear forward movement is restricted by the inner wall of said central bore.

4. A catch-and-release device as described in claim 3 wherein said crank rotation is limited to an arc of approximately 90°.

5. A catch-and-release device as described in claim 4 wherein said crank arm is movable in a plane normal to the crank axis, said crank arm, when aligned with the longitudinal axis of said elongated body defining a null position, said crank arm, when beyond the null position in one direction transmitting the spring force against opening of the device, and, when beyond the null position in the other direction, transmitting the spring force toward locking of the device.

6. A catch-and-release device as described in claim 5 wherein said crank arm linear forward movement is unrestricted and said crank arm linear rearward movement is restricted by the inner wall of said central bore.

7. A catch-and-release device as described in claim 3 wherein said crank rotation limitation is over a sector which includes a null position.

8. A catch-and-release device for holding the lip of a fish comprising, in combination:

an elongated body having a handle portion at one end and a longitudinal axis therethrough;

a central bore in said elongated body and coaxial therewith at the end opposite said handle portion, said central bore being open at one end and extending to said handle portion;

a fixed pivot in said elongated body adjacent said open end of said central bore;

a pair of jaws, each attached at one end thereof to said fixed pivot and rotatable thereabout between a closed position with the unattached ends of said jaws meeting and an open position for accepting the lip of a fish;

a pair of operating arms each having a first end and a second end and each attached at said first end thereof to one of said jaws for moving said jaws between an open position and a closed position;

a crank and slider assembly having a crank portion and a slider portion mounted for reciprocal movement of said slider portion thereof in said central bore, said crank and slider assembly, in turn, further comprising;

a spring;

a slider portion attached to said spring and exerting a spring bias toward said handle portion;

a first movable pivot;

a crank portion having a null position;

a second movable pivot in said slider portion and adjacent said pair of jaws, said movable pivot attaching said second ends of said operating arms to the slider portion and upon reciprocation of the slider portion moving the jaws between an open and a closed position;

a crank arm attached at one end to the end of said slider portion opposite said first movable pivot and at the other end, eccentrically attached to said crank portion;

said crank and slider assembly with the catch-and-release device in an open condition, when provided with an operating force overcoming said spring bias, operates to close said jaws and, upon passing said null position, said spring bias is exerted to lock said device; and, said crank and slider assembly with the catch-and-release device in a closed condition, when provided with an operating force overcoming said spring bias, operates to open said jaws and, upon passing said null position, said spring bias operates to open said jaws.

9. A catch-and-release device as described in claim 8 wherein said crank arm linear forward movement is unrestricted and said crank arm linear rearward movement is restricted by the inner wall of said central bore.

10. A catch-and-release device as described in claim 9 wherein said crank rotation is limited to an arc of approximately 90°.

11. A catch-and-release device as described in claim 8 wherein said crank rotation limitation is over a sector which includes said null position.

\* \* \* \* \*